United States Patent [19]

Eichler

[11] 4,427,341
[45] Jan. 24, 1984

[54] SIDE PROPELLERS FOR THE PROPULSION OF FAST BOATS AND AIRCRAFT

[76] Inventor: Horst Eichler, Auf dem Sande 12, 54-Koblenz-Pfaffendorf, Fed. Rep. of Germany

[21] Appl. No.: 222,930

[22] Filed: Jan. 6, 1981

Related U.S. Application Data

[62] Division of Ser. No. 913,801, Jun. 8, 1978, Pat. No. 4,253,799, which is a division of Ser. No. 690,275, May 26, 1976, Pat. No. 4,130,378.

[30] Foreign Application Priority Data

May 26, 1975 [DE] Fed. Rep. of Germany ....... 2523180

[51] Int. Cl.³ .............................................. B64C 11/28
[52] U.S. Cl. ....................................... 416/142; 416/87
[58] Field of Search ........... 416/142 R, 142 A, 142 B, 416/88-89, 87

[56] References Cited

U.S. PATENT DOCUMENTS

| 33,874 | 12/1861 | Baylis | 416/198 |
|---|---|---|---|
| 1,947,560 | 2/1934 | Manasek | 446/210 X |
| 2,526,451 | 10/1950 | Bensen | 416/52 X |
| 2,986,219 | 5/1961 | Boardman, Jr. et al. | 416/48 |
| 3,254,725 | 6/1966 | Higgins | 416/142 X |
| 3,589,647 | 6/1971 | Burkham | 416/142 X |
| 3,957,229 | 5/1976 | Davis | 416/142 X |
| 4,130,378 | 12/1978 | Eichler | 416/175 |
| 4,253,799 | 3/1981 | Eichler | 416/175 |

FOREIGN PATENT DOCUMENTS 500363  5/1976  U.S.S.R. ............................ 416/87

Primary Examiner—Everette A. Powell, Jr.
Attorney, Agent, or Firm—Schwartz, Jeffery, Schwaab, Mack, Blumenthal & Koch

[57] ABSTRACT

A large diameter propeller for starting a watercraft or aircraft has blades which fold forward about tangents along the hub circuit for very high speed operation. Then, the flank pressure radial to the propeller axis will reduce induction, cavitation, noise and centrifugal power, and as a consequence, the radial acceleration of the seized medium (while the speed of the traveling craft is very high) will be so slow that turbulances resulting in propulsion losses are minimized.

1 Claim, 8 Drawing Figures

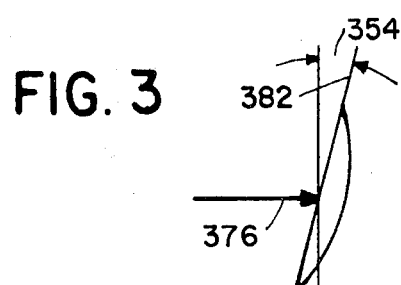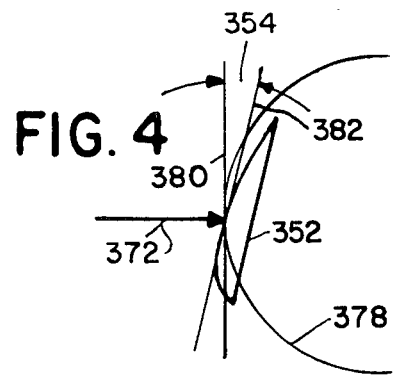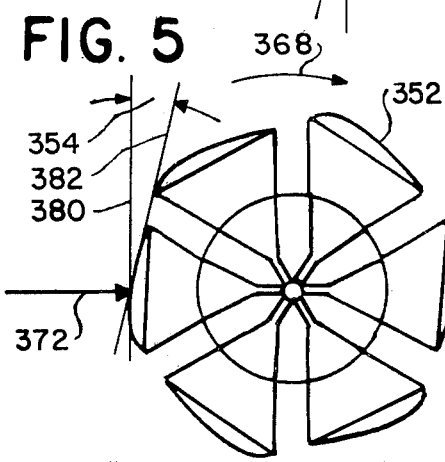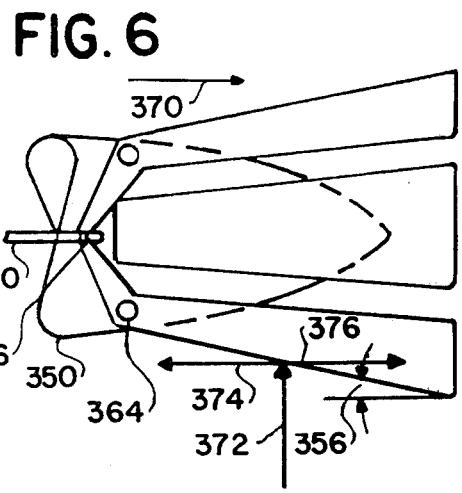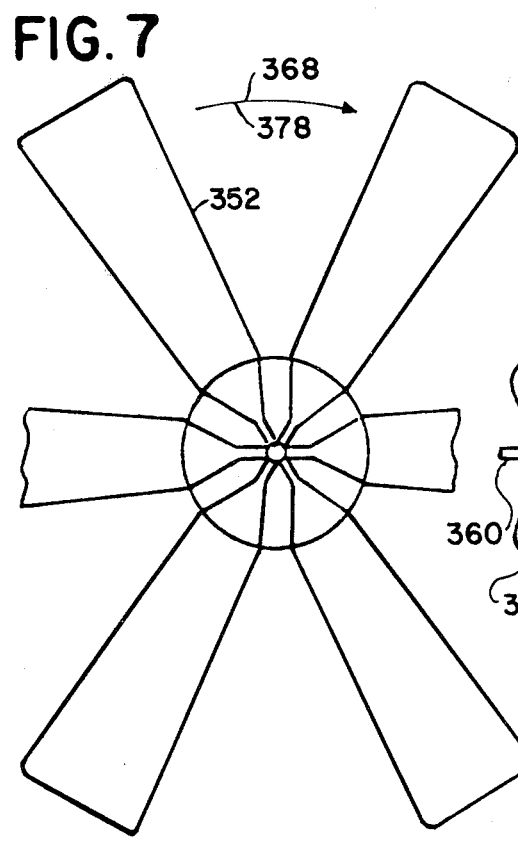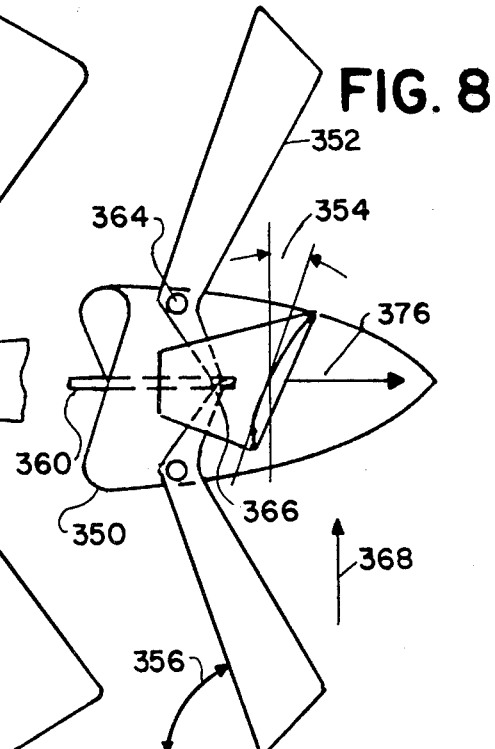

SIDE PROPELLERS FOR THE PROPULSION OF FAST BOATS AND AIRCRAFT

CROSS REFERENCE TO RELATED APPLICATIONS

The present application is a division of US Pat. application Ser. No. 913,801 filed June 8, 1978 (now U.S Pat No 4,253,799 issued Mar 3, 1981), which in turn is a division of US Pat. application Ser No. 690,275 filed May 26, 1976 (now U.S Pat. No. 4,130,378 issued Dec. 19, 1978).

BACKGROUND OF THE INVENTION

The present invention relates to propeller drive systems for bodies traveling through a fluid medium, such as fast boats and aircraft. In particular, the invention relates to propellers having blades declining from folded positions, i.e., positions nearly parallel to the axis of rotation of the propeller shaft, to open positions, i.e., positions like conventional screw-type propellers in which the blades are mounted radially with respect to the propeller shaft axis.

THE PRIOR ART

A variety of methods have been employed in the past for propelling bodies through a fluid medium, such as resistance propulsion and buoyancy propulsion.

Resistance propulsion, such as that given by paddle wheelers, is based upon impulses acting in the direction opposite to the traveling direction of the moving body. Buoyancy propulsion, for example, that given by a conventional screw-type propeller, requires movement transverse to the traveling direction of the body, which results in forward thrust lift.

Limited efficiency by turbulence, oscillation of propeller blades caused by cavitation, a spoiling loss (induction) at the blade tips and noise make conventional propellers insufficient for very high speeds. This is mainly because conventional screw propellers, in comparison with the present invention, present the disadvantage that their efficiency decreases at increased flying speed or traveling speed, because the air or the water medium in the propeller blade area (discareal) is excessively accelerated or agitated. With their radially pivoted blade shapes, conventional propellers for aircraft and ships fail at the borderline of high speed because they can engage the fluid medium only within the cylinder "jacket" of the medium which circumscribes the area traversed by the blades. Therefore, the medium is agitated by turbulance to a disproportionate extent and losses occur which minimize the effective propulsion force.

SUMMARY OF THE INVENTION

It is accordingly an object of the invention to provide a propeller for driving a body through a fluid medium, which overcomes the disadvantages of the prior art.

It is a further object of the invention to provide such a propeller which will accelerate a relatively large water or air mass radially outward or inward (flank pressure) with respect to the propeller shaft, whereby the spoiling losses (induction and cavitation) and noise generation connected with deflection of the fluid medium in a direction transverse to the traveling direction of the moving body remains small. Also, the flank pressure will compensate the centrifugal power of the blades.

It is the object of the invention to provide a propeller blade in which the circumscribed cylinder of medium which is traversed by the propeller increases with an increasing forward speed, whereby the radial acceleration of the engaged medium becomes so small that turbulences resulting in propulsion losses are minimized.

The cone angle relative to the propeller shaft axis may be increased (opened) for operation at low speed so that the propeller blades will act as conventional radially positioned propeller blades. At high speed, the blades are repositioned (folded) so that they make a smaller angle with respect to the propeller shaft axis.

Further details and objects of the invention will become apparent to those skilled in the art in view of the following description of the drawings.

BRIEF DESCRIPTION OF THE DRAWINGS

FIG. 3 demonstrates the thrust of a conventional propeller blade;

FIG. 4 shows a bent blade profile rotating in a narrow circle;

FIG. 5 is the section view of the folded propeller showing the thrust;

FIG. 6 is the side view of FIG. 5;

FIG. 7 is the section view of the open propeller; and

FIG. 8 is the side view of FIG. 7 showing the thrust.

DETAILED DESCRIPTION OF THE PREFERRED EMBODIMENTS

Figure 1:
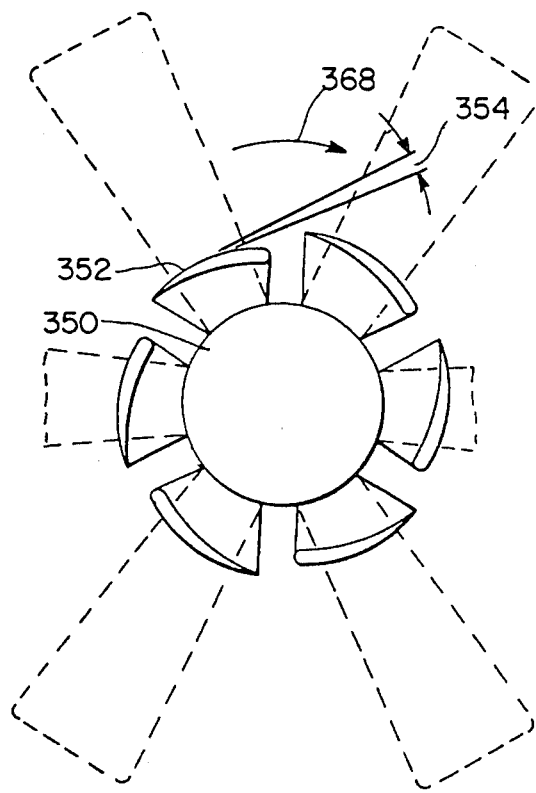
FIG. 1 is a section view of the flank propeller of the present invention in which the propeller blades are folded or open.
Figure 2:
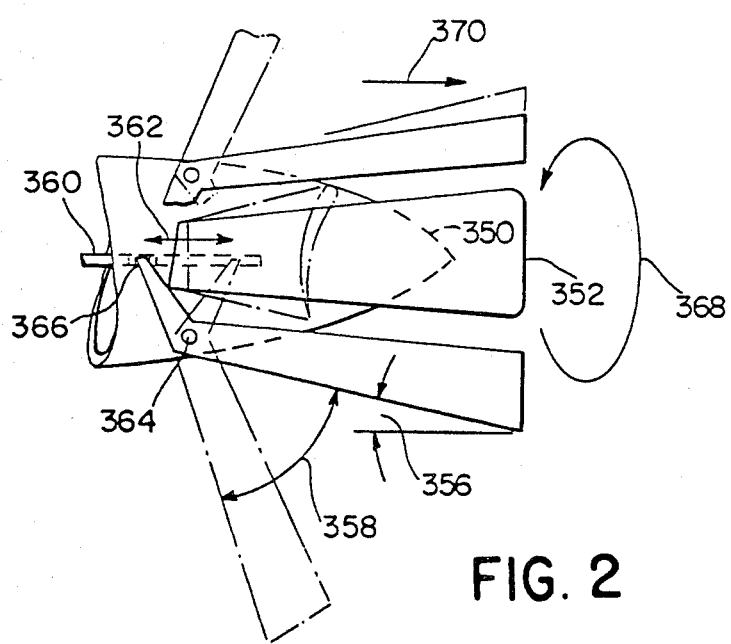
FIG. 2 is the side view of FIG. 1 showing the cone angle between folded and open positions.

As shown in FIGS. 1 and 2, a flank propeller can be arranged so the blades can be folded inwardly or outwardly (folded or open) with respect to the propeller shaft axis. This allows efficient operation at high traveling speeds through the fluid medium, yet also permits the blades to act so conventional propeller blades at low traveling speeds when starting.

The propeller pitch about a tangent along the periphery of the hub 350 is variable to provide optimum efficiency at either high or low traveling speeds. Hub 350 has mounted thereon a plurality of propeller blades 353, each blade being set at pitch angle 354 with respect to a tangent to the propeller circle. The pitch angle of the blades for high-speed operation is shown at 356 with respect to parallels to the propeller shaft axis, while the pitch angle 356 may be adjusted by an amount equal to angle 358 in order to allow for efficient low-speed operation. Modification of pitch angle 356 is effected by moving adjusting rod 360 as shown at 362. Each blade is pivotally mounted to the hub by a pivot 364 and is connected to the adjusting rod 360 at lever point 366. Although the system shown is a somewhat crude representation of a mechanical adjustment linkage, it will be understood by those skilled in the art that any conventional pitch adjustment apparatus may be used to effect the pitch adjustment. Rotation of the adjustable flank propeller in the clockwise direction 368 (in front view) will result in thrust 376 (in side view) in the traveling direction 370.

FIG. 3 shows a linearupwards driven profile of conventional propeller blades by the effective angle of attack 354 producing thrust 376 in traveling direction 370. For turning around a near disk circle 378 in the folded propeller (see FIG. 4), the profile of blade 352 has to be bent into a shape, in which a wide circle 378 of the opened starting propeller (see FIG. 8) will not be most effective.

FIGS. 5 and 6 each demonstrate the folded, high-speed traveling propeller. In front view (see FIG. 5), the propeller turns clockwise in direction of revolution 368, producing flank pressure 372, while the angle of attack 354 around parallels to the propeller axis between the tangents 380 along the disk circle 378 and the profile axis 382 of blade 352 is most effective. FIG. 6 shows the side view from starboard. The flank pressure 372 will be turned around by the cone angle 356 to the movement rear 374 producing thrust 376.

FIGS. 7 and 8 each demonstrate the open starting propeller. In front view (see FIG. 7), the propeller turns clockwise 368. FIG. 8 shows the side view from starboard, where the upward clockwise direction 368 orofile of blade 352 by the effective angle of attack 354 produces thrust 356 in traveling direction 370 like the conventional propellers.

The following list indicates the elements, relationships or features designated by the reference characters in the drawings:

350: hub
352: blade, folded or open propeller
354: angle of attack of blades 352 declined about parallels to axis of hub 350 and between axis 382 of profile of blade 352 and tangents 380 along the disk circle 378 of the propeller
356: cone angle of the blades 352 declined about the tangents 380 and between parallels to the propeller axis and the long-profile of blade 352
358: max done angle between folded and open propeller
360: adjusting rod retracting or extending in or out of hub 350
362: way of rod 360 between max retracting and extending
364: pivot for declining blades 352 from folded to open
366: lever point between rod 360 and all blades 352
368: direction of revolution of propeller
370: traveling direction of boat or aircraft
372: flank pressure radial to propeller axis
374: movement of medium transverse the traveling direction 370
376: thrust in traveling direction 370
378: disk circle of the propeller
380: tangent along the disk circle 378
382: axis of profile of blade 352

I claim:

1. A propeller for providing forward thrust to a body traveling at relatively high speed through a surrounding fluid medium, comprising:
    (a) a propeller hub having an axis of rotation;
    (b) a plurality of airfoil surfaces mounted to and distributed radially about said hub;the position of each said airfoil surface being defined by first and second pitch angles, respectively, said first pitch angle being the angle in the rotation direction between the profile longitudinal axis of said airfoil surface and a tangent on the circular arc described by the rotation of said airfoil surface about said propeller hub, and said second pitch angle being the angle between the profile transversal axis of said airfoil surface and said axis of rotation;
    (c) each airfoil surface having a pivot connection in the region of said hub so that said airfoil surfaces are pivotable about said pivot connections between, on the one hand, an outwardly unfolded condition in which said blades are at a relatively large angle with respect to the hub axis and in which outer ends of said airfoil surfaces are disposed at relatively great distances from the hub axis and, on the other hand, an inwardly folded condition in which said airfoil surfaces are at a relatively small angle with respect to said hub axis and in which said outer ends of said airfoil surfaces are disposed at a relatively small distance from the hub axis;
    (d) said second pitch angle being relatively large when said airfoil surfaces are in their outwardly unfolded condition, said second pitch angle being relatively small when said airfoil surfaces are in their inwardly folded condition;
    (e) means for modifying said second pitch angle while said propeller is rotating by opening and folding the propeller by pivoting each airfoil surface, whereby said propeller will operate predominately as a conventional screw-type propeller for operation at low traveling speed through said fluid medium when said second pitch angle is large, and said propeller will provide greater efficiency at high traveling speeds than a conventional screw-type propeller when said second pitch angle is relatively small.

* * * * *